United States Patent [19]

Kitamura et al.

[11] Patent Number: 4,812,970
[45] Date of Patent: Mar. 14, 1989

[54] MICROPROGRAM CONTROL SYSTEM

[75] Inventors: Toshiaki Kitamura, Tokyo; Katsumi Onishi, Kawagoe; Yuji Oinaga, Tokyo, all of Japan

[73] Assignee: Fujitsu Limited, Kawasaki, Japan

[21] Appl. No.: 758,664

[22] PCT Filed: Nov. 8, 1984

[86] PCT No.: PCT/JP84/00533
§ 371 Date: Jun. 25, 1985
§ 102(e) Date: Jun. 25, 1985

[87] PCT Pub. No.: WO85/02278
PCT Pub. Date: May 23, 1985

[30] Foreign Application Priority Data

Nov. 10, 1983 [JP] Japan .................. 58-211239
Nov. 10, 1983 [JP] Japan .................. 58-211232

[51] Int. Cl.⁴ .................................. G06F 9/28
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 3,800,293 | 3/1974 | Enger et al. | 364/200 |
| 4,179,736 | 12/1979 | Wilhite | 364/200 |
| 4,187,539 | 2/1980 | Eaton | 364/200 |
| 4,197,578 | 4/1980 | Wada et al. | 364/200 |
| 4,228,497 | 10/1980 | Grupta | 364/200 |
| 4,245,302 | 1/1981 | Amdahl | 364/200 |
| 4,251,859 | 2/1981 | Momose et al. | 364/200 |
| 4,373,180 | 2/1983 | Linde | 364/200 |
| 4,390,946 | 6/1983 | Lane | 364/200 |
| 4,439,827 | 3/1984 | Wilkes | 364/200 |
| 4,631,672 | 12/1986 | Sakamoto | 364/200 |

FOREIGN PATENT DOCUMENTS 84904160 3/1986 European Pat. Off. .
2046963A 1/1980 United Kingdom .

OTHER PUBLICATIONS

IBM Technical Disclosure Bulletin, vol. 25, No. 8, Jan. 1983, pp. 4300–4301, New York, US; D. W. Finney et al.: "NLM ROS Bit Sets Up Unique First Microcycle".

Primary Examiner—Gareth D. Shaw
Assistant Examiner—Debra A. Chun
Attorney, Agent, or Firm—Staas & Halsey

[57] ABSTRACT

According to the present invention, in a data processing unit which executes pipeline processings by developing an instruction into multiple flows through microprogram control, is a method provided where the microinstruction is divided into a part for controlling a first stage of pipeline and a part for controlling second and successive stages. The part for controlling the first stage is read simultaneously with the part for controlling the second and successive stages of the flow prior to the current flow. The present invention thus provides an advantage in that microprogram control can be employed for the first stage of the pipeline and resulting in a data processing unit which is capable of executing more flexible pipeline processings than the prior art can be formed. In an instructs a field for controlling the first stage of pipeline is separated from the fields for controlling the other stages and it is read at the same timing as that for reading the fields for controlling the second and successive stages of the flow just prior to the current flow. As a result, the first state of pipeline in the second and successive flow is controlled by microprogram control.

13 Claims, 5 Drawing Sheets

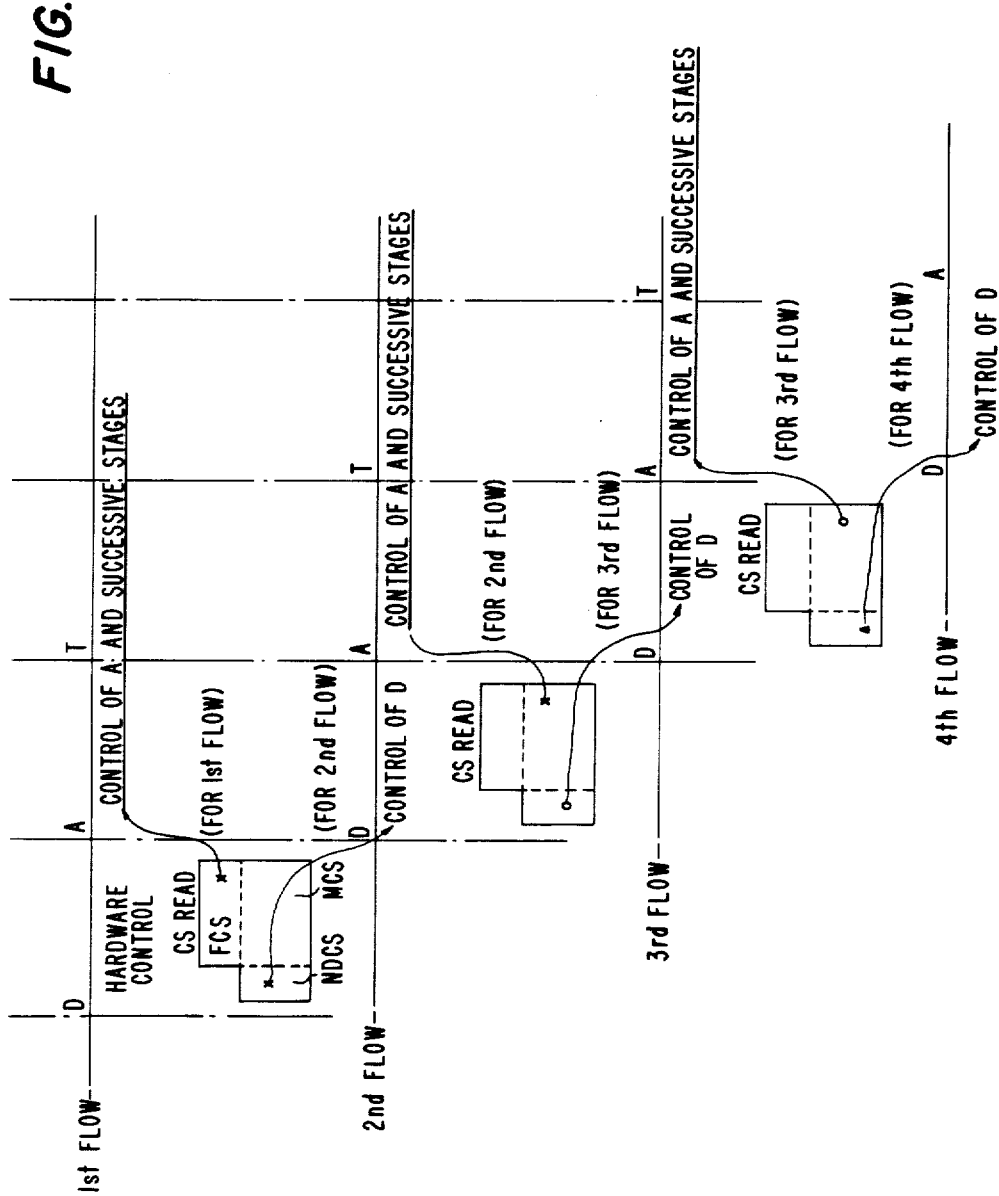

MICROPROGRAM CONTROL SYSTEM

CROSS REFERENCE TO RELATED APPLICATIONS

This application is related to U.S. Applications having Ser. Nos. 755,321, 758,665 and 752,190.

BACKGROUND OF THE INVENTION

1. Field of the Invention

The present invention relates to a microprogram control system, and particularly to a microprogram control system in a data processing unit employing a pipeline control system, wherein flexibility is imparted to the system by reading microinstructions and suppressing a hardware control mode to execute processings with microinstructions corresponding to each flow when executing an instruction which results in processing several flows.

2. Description of the Related Art

As shown in FIG. 1, for example, prefetched instructions are executed in each stages D, A, T, B, E and W by a pipeline processor. In FIG. 1, 1 is an instruction word register for an instruction word. 2 is a control storage or memory storing microinstructions. 3 to 7 are microinstruction field registers which issue instructions for processing to the hardware corresponding to stages D to W. 8 is a general purpose register group. 9 is a base register. 10 is an index register. 11 is a displacement register. 12 is an address calculator or three input adder. 13 is a logical address register. 14 is a TLB (Address Translation Buffer). 15 is an address buffer. 16 is a buffer memory. 17 is an operand register. 18 to 20 are operand buffer registers. 21 is an operand register. 22 is an operation unit such as an adder. 23 is a result register. The general purpose register group 8 is a register group to be used in the three stages D, B and W.

When an instruction 1 is supplied to the pipeline indicated in FIG. 1, a microinstruction required for executing the pertinent instruction 1 is read and loaded into the register 3 in stage D (decode). Simultaneously, a value is loaded into the registers 9, 10 and 11 to calculate the address for the operand (Opr 2 in the figure) which is required for executing the pertinent instruction 1. The address of the operand Opr 2 is calculated by the calculator 12 in stage A (address) and the result is loaded into the logical address register 13. The TLB 14 and buffer memory 16 are indexed through the stages T (translate) and B (buffer access) and a value of the operand is loaded into the register 17. At this time, a value of operand Opr 1 is also loaded into the register 21. At this point, the specified operation is carried out by operation unit 22 in the stage E (execution) and the operation result is loaded into the general purpose register 8 in the stage W (write).

The pipeline control is conducted as explained above and the processings for each stage advances in such a way that the microinstructions are read from the control memory 2 shown in the figure and these instructions are executed sequentially. On the one hand, when of executing a given instruction 1, the necessary processings are sometimes not completed by only the processing flow executed along the pipeline processing stages from stage D to stage W in FIG. 1 (called the processing flow). In general, a plurality of processing flows are required for execution of some instructions and the respective processing flows are desired to be completely executed by microinstructions. In such a case, the bit groups of microinstructions corresponding to one flow of processing read from the control memory 2 are forced to correspond to the controls for respective stages of the pipeline and thereby the respective corresponding bit groups instruct the processing in respective stages from the registers 3, 4, 5, 6, 7 shown in FIG. 1.

As explained above, instructions have been developed for a plurality of flows and processing has been conducted by reading microinstructions corresponding to respective flows from the control memory 2. But, there is a restriction in the time (a minimum available or necessary) for accessing the control memory 2 and as a result the controls in stage D of each flow has been performed by hardware and it has been difficult to employ a control method using microprograms.

Accordingly, the hardware is large in size and when modifications of functions at stage D are required, the hardware must be modified. Thereby, although it is a data processing unit executing on the basis of microprogram control system, it does not have sufficient flexibility in the microprogram control for the modification of functions. Therefore, a system which can realize the microprogram control in all stages is desired.

Namely, the microprogram control system of the prior art which controls a data processing unit for pipeline processing takes a longer time for reading control memory and delay for timing for control of the first stage (stage D) of pipeline are necessary. As a result, this stage has been controlled by a hardware decoder or a dummy cycle has been inserted in the cycle clock in order to provide sufficient time to read the control memory.

The control using hardware, however, has a disadvantage in that it is difficult to realize flexible and sophisticated control and the method of inserting the dummy cycle is also followed by a disadvantage in that the dummy cycle appears between the processing times for the instructions, thereby lowering processing speed.

SUMMARY OF THE INVENTION

Considering the abovementioned disadvantages of the prior art, it is an object of the present invention to provide a system for controlling the first stage of pipeline using microprograms.

According to the present invention, this object can be attained by providing a method where the microinstructions are divided into a part for controlling said first stage D of pipeline and a part for controlling the second and successive stages (A ~ W). The part for controlling the first stage is read simultaneously with the part for controlling the stages after the first stage of the first flow just earlier than the current or second flow. The method of the present invention provides an advantage in that the first stage of the pipeline can be controlled by a microprogram and a data processing unit which executes with a more flexible pipeline processing method than that of prior art can be constructed. In the instruction a field for controlling the first stage of the pipeline is separated from the fields for controlling the other stages and the first stage field is read at the same timing as that for reading the fields for controlling the second and successive stages of the flow just prior to the second flow. Thereby, the first stage of the pipeline in second and succeeding flows is controlled by the microprograms.

BRIEF DESCRIPTION OF THE DRAWINGS

FIG. 2 shows the concept of control according to the present invention.

DESCRIPTION OF THE PREFERRED EMBODIMENT

Even when the present invention is applied, stage D of the first flow is controlled for execution of the multiflow instruction 1 by hardware because there is insufficient time for reading the control memory 2.

In stage D, microinstructions are read simultaneously by the part corresponding to the first flow of the control memories for stage A and successive stages (hereinafter referred to as FCS) and by the control memory for stage D (hereinafter referred to as NDCS) and the microinstructions read from FCS are used for controlling stage A and successive stages of the first flow and the microinstructions read from NDCS are used for controlling stage D of the second flow.

In stage D of the second flow, the microinstructions to be used for controlling stage A and successive stages of the second flow are read by a part corresponding to the second flow and successive flows of the control memories for stage A and successive stages (hereinafter referred to as MCS) and simultaneously the microinstructions to be used for control of stage D of the third flow are read from said NDCS.

Figure 3A:
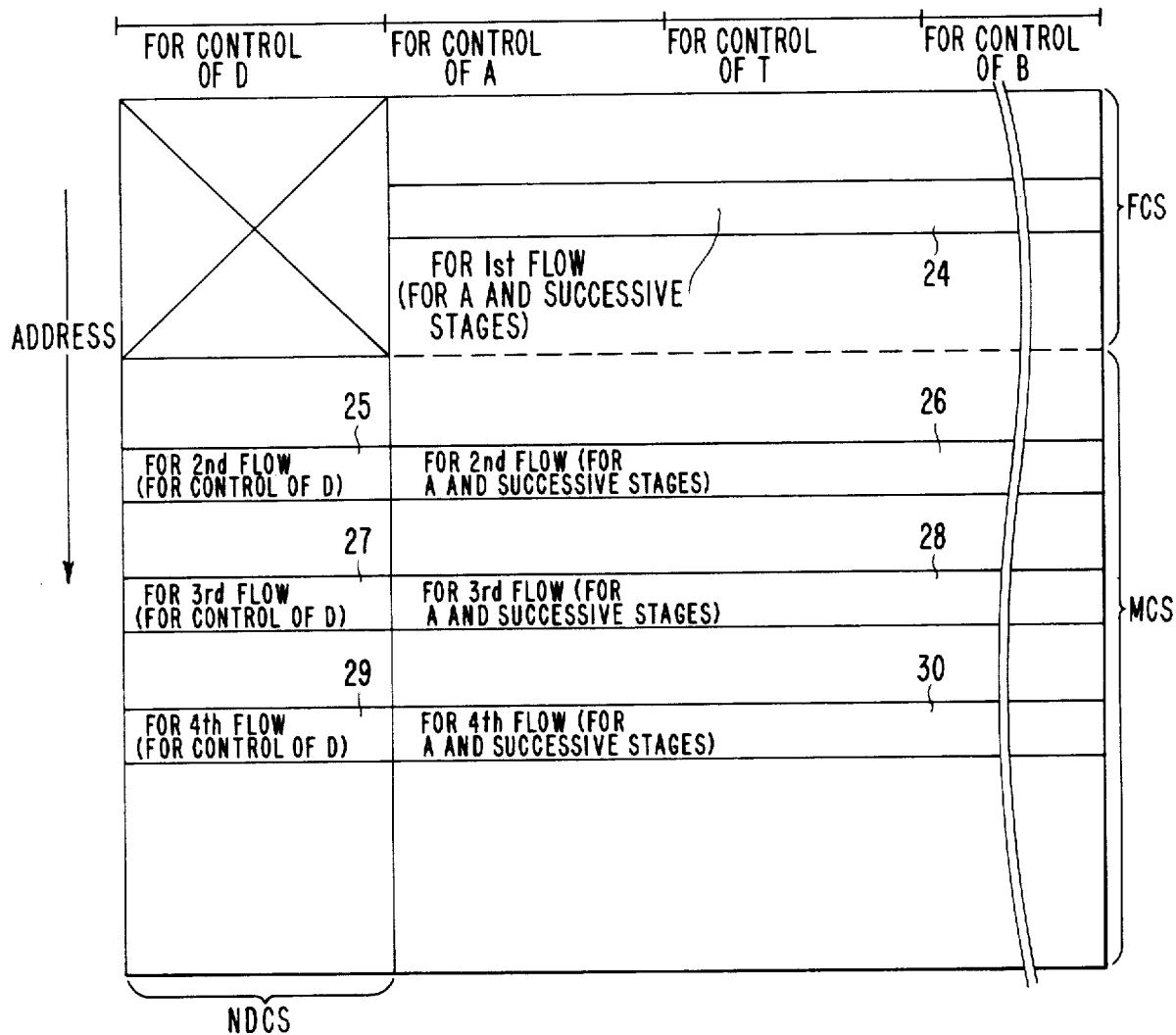
FIGS. 3(A) and 3(B) are logical structures of an embodiment of control memory to which the present invention is applied.
Figure 3B:
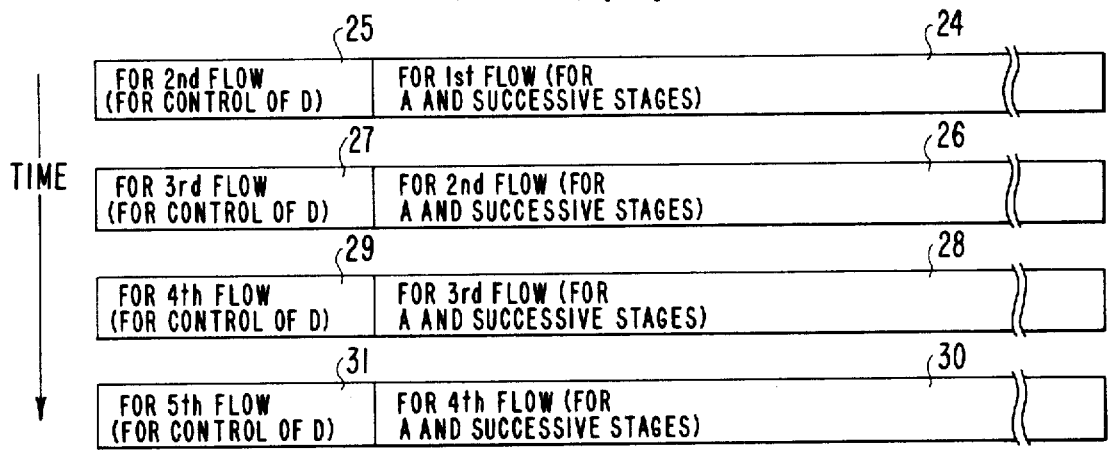

An inter-relationship between the logical arrangement of control memories to which access is made as explained above and the fields are read at the indicated timing as shown in FIG. 3(A). In this figure, D, A, T, . . . indicate the positions of fields for controlling each stage in the microinstruction. The part indicated by X indicates there is no corresponding part in the NDCS because the stage D of the first flow is controlled the hardware. As is apparent from FIG. 3(A), even when the field for controlling stage D which forms the microinstructions corresponding to the first flow and the fields for controlling stages A, T, . . . , are separated for NDCS and MCS, access can be realized using the same address. However, with respect to the read timing, as shown in FIG. 3(B), in the stage D of the first flow, field 24 corresponding to control for the first flow and field 25 corresponding to control of stage D for the second flow are read at the same timing. In stage D of the second flow shown in FIG. 2, field 26 corresponding to control for stage A and successive stages for the second flow and field 27 corresponding to control of stage D for the third flow are read at the same timing. The similar processings are repeated for successive stages.

Figure 1:
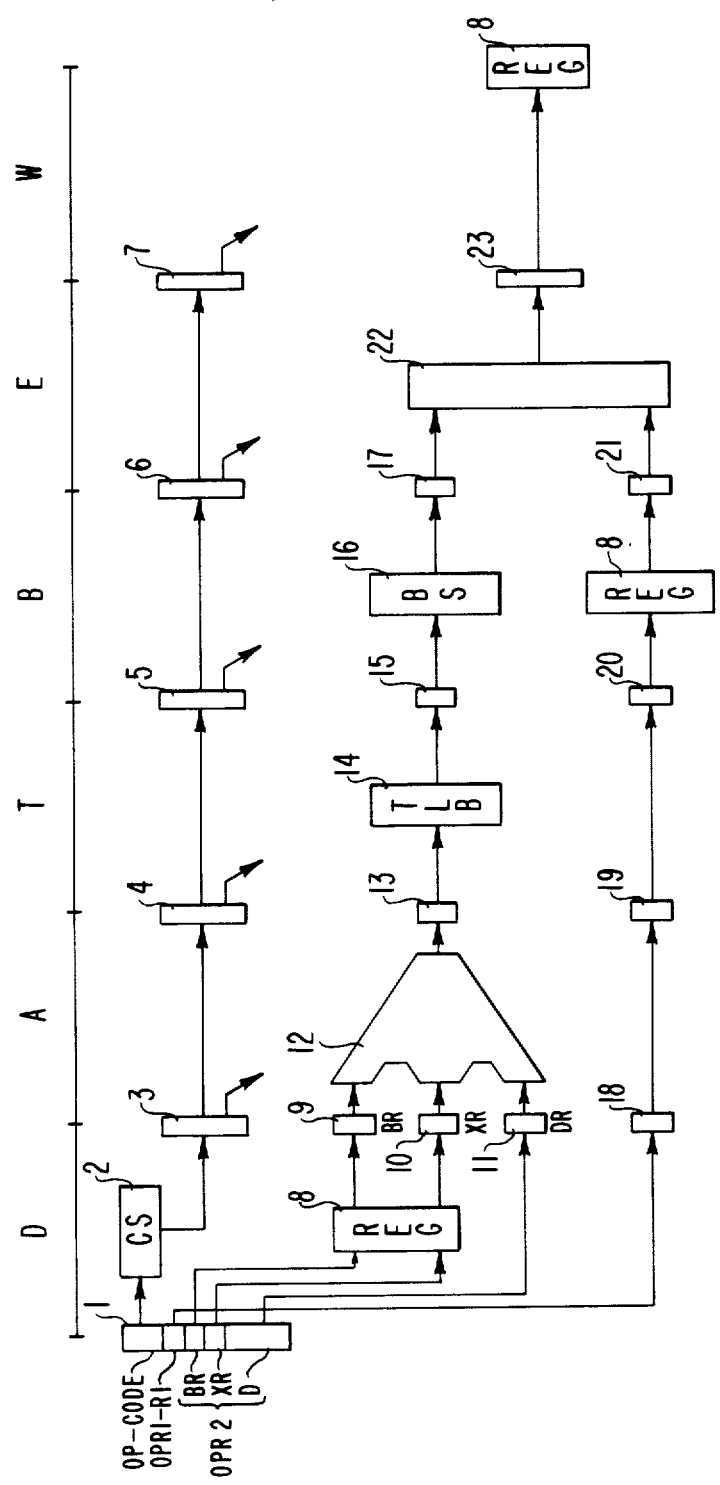
FIG. 1 shows the structure of a pipeline for executing instructions during the advancement of processing through stages.
Figure 4:
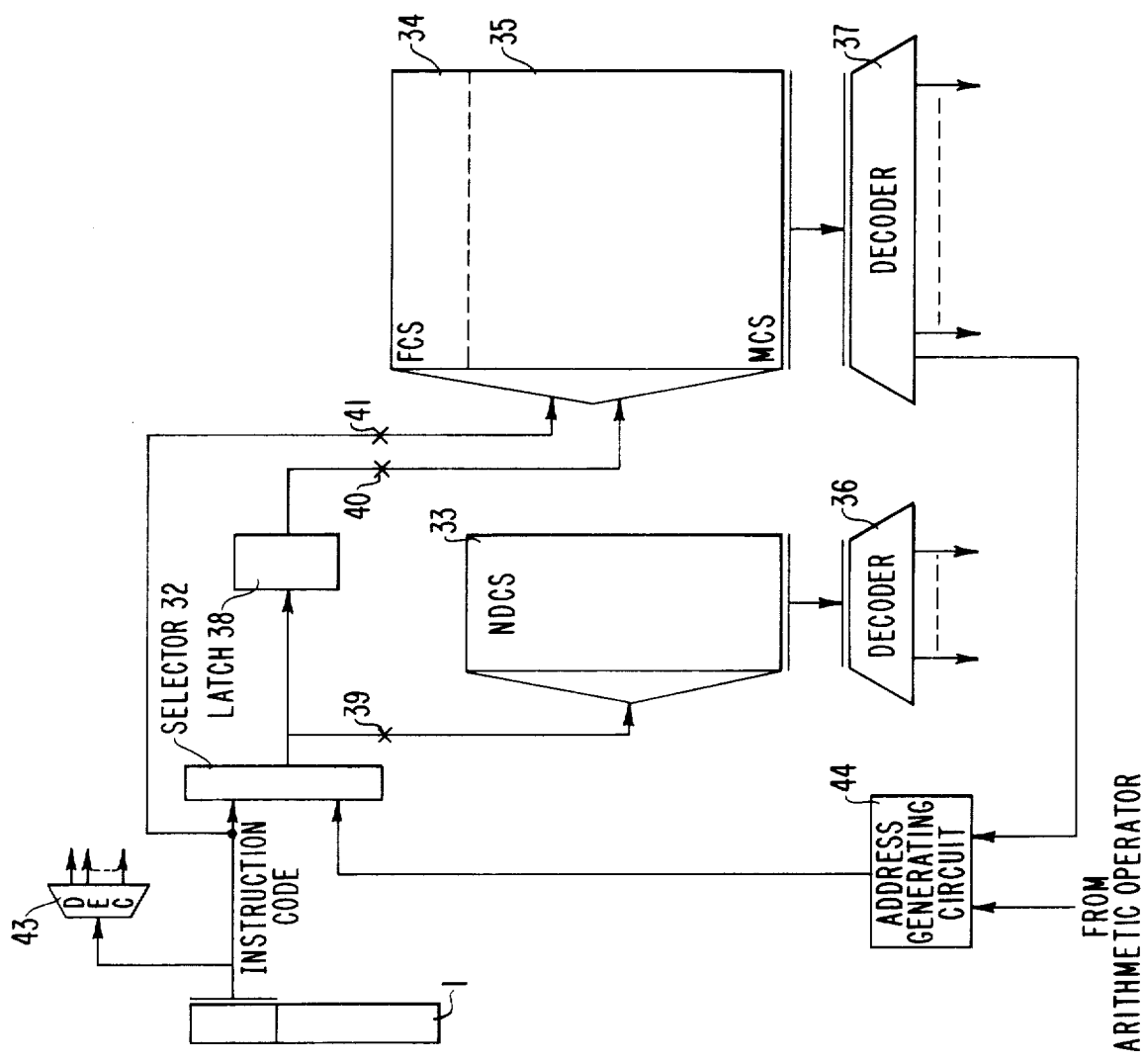
FIG. 4 is a block diagram of an embodiment of the present invention.

FIG. 4 is a profile explained by referring to FIG. 3. FIG. 4 shows a block diagram of an embodiment for making access to the control memories 2 shown in FIG. 1. In the same figure, 32 is a selector; 33 is a control memory for stage D (NDCS); 34 is a part corresponding to the first flow of the control memories for stage A and successive stages (FCS); 35 is a part corresponding to the second flow and successive flows of the control memories for stage A and successive memories; 36 and 37 are microprogram instruction decoders; 38 is a latch; 39 to 41 are gates. 43 is a decoder for cycle D of the first flow and 44 is a circuit for generating control memory addresses for the second and successive flows.

A method of making access to the control memories in the present invention is explained hereunder by referring to FIGS. 2, 3 and 4. When an instruction to be executed is loaded into the instruction register 1, access is made to FCS 34 by the operation code at the timing of stage D of the first flow of said instruction and thereby the fields of microinstruction to be used for control of stage A and successive stages of the first flow are read. Simultaneously access is also made to NDCS 33 through the selector 32, and thereby the fields of the microinstruction to be used for control of stage D of the second flow are read and the control signals to be used for control in each stage are output by the decoders 36, 37.

The addresses used for the access are stored in latch 38, access is also made to MCS 35 at the timing of stage D of the second flow 2. Thus, the fields of microinstruction used for the control of stage A and successive stages of the second flow are read out. Simultaneously, access is made to the NDCS 33 through the selector 32 with the next microaddress generated by the address generating circuit 44 on the basis of the address part of microinstruction to be used for the control of stage A and successive stages of the first flow which has been read and decoded previously. Thereby, the fields of the microinstruction to be used for the control of stage D of the next or third flow, is read out using the microaddress. The address is stored in the latch 38 and access is made to MCS 35 in the stage D for the next field in the third flow.

Thereafter, in a similar manner, access is made to control memory (MCS) 35 for stage A and successive stages of the flow with the address stored in the latch 38 in stage D of each flow in order to read the field of the microinstruction to be used for the control of stage A and successive stages. Simultaneously, access is made to control memory (NDCS) 33 for stage D of the next flow with an output of the address generating circuit to read the field of the microinstruction to be used for the control of the stage and is followed by repetition of storing of the address in the latch 38.

With the above operation, a control system using a microprogram can be introduced into the first stage D of the pipeline which has been previously controlled by hardware.

It is desirable to employ the above described structure in FIG. 4, however, further improvements can be made. When processing is executed using plural flows as explained above, the processing contents of the first flow is different from that of the second flow and the number of control points or lines in the first flow can be lower than the number of control points in the second and successive flows. In FIG. 4, the bit width of content stored in the FCS is equal to the bit width of content stored in the MCS, without consideration of such the different in control points. Particularly, in a current large scale data processing unit, a majority of the generally used instructions are processed within the first flow. Therefore, it is desirable to effectively use the difference between the microinstruction corresponding to said first flow and the microinstruction corresponding to the second flow.

Figure 5:
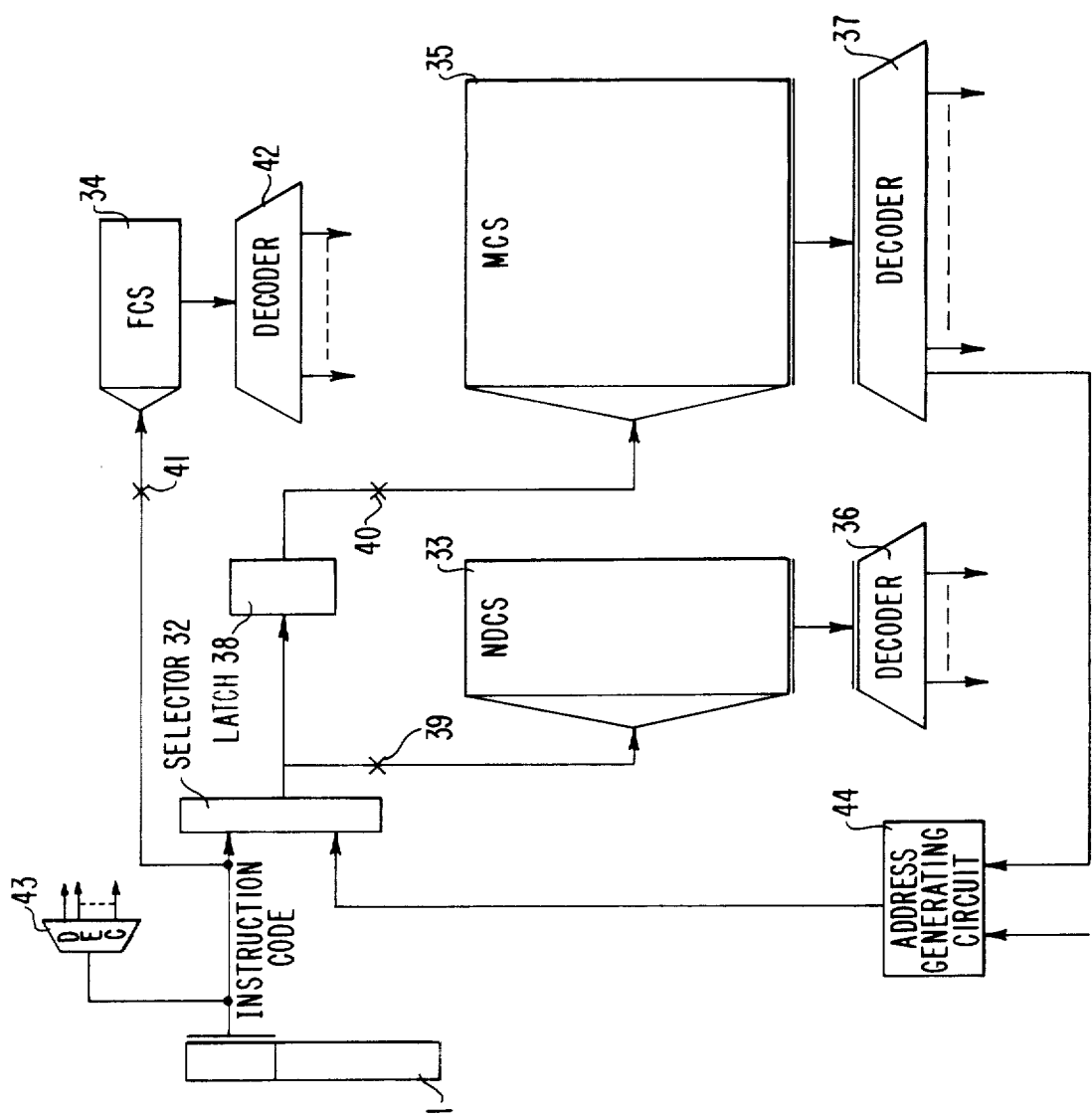
FIG. 5 is a block diagram of another embodiment of the present invention.

FIG. 5 shows a block diagram of an embodiment of the present invention which improves in the above area. In the same figure Numerals, 32 to 41 correspond to the same element as those in FIG. 4 and 42 is a decoder for FCS. The operation of FIG. 5 is the same as that in FIG. 4. However, the bit width of FCS 34 shown in FIG. 5 is smaller than that of MCS 35 and the control memory in FIG. 5 is more effectively used as compared with FIG. 4 and the access time is reduced due to the reduction in the bit width and address range.

We claim:

1. A microprogram control method for a multi-flow machine instruction executed by several microinstructions, each microinstruction having plural parts, using a pipeline having a plurality of execution stages each microinstruction part controlling a different stage, and each flow controlled by a different microinstruction, said method comprising the steps of:

hardware decoding the machine instruction for controlling a first stage of a first flow in said pipeline, fetching a second part of a first microinstruction for controlling second and successive stages in the first flow and fetching a first part of a second microinstruction for controlling a first stage in a second flow, respectively in parallel; and executing the second part of the first microinstruction, executing the first part of the second microinstruction and fetching a second part of the second microinstruction for controlling the second and successive stages of the second flow, respectively in parallel.

2. A microprogram control method according to claim 1, further comprising:

using a first memory for storing said first part of said second microinstruction and a second memory for storing said second part of said first and second microinstructions;

delaying address information for accessing said first memory by at least one stage and accessing said second memory in said second flow; and accessing said first memory and said second memory in parallel in the second flow.

3. A microprogram control method according to claim 2, further including:

using the second memory including a first flow memory which stores microinstructions for processing of the first flow and a second flow memory which stores microinstructions for processing of the second and successive flows; and using microinstructions stored in the first and second flow memories with a different bit width.

4. A microprogram control method according to claim 1, wherein the processing which controls the first stage corresponding to the first flow among the processings developed in said multiple flows is executed using hardware control.

5. A method of processing a multi-flow machine instruction, having first and second flows where execution of each flow is controlled by a different microinstruction, in a pipeline processing unit having a hardware decoder, a microprogram controlled control storage access stage and microprogram controlled successive stages, each microinstruction having plural parts each part controlling one of the stages, the microinstructions being shifted through the successive stages, said method comprising the steps of:

(a) decoding the machine instruction for the first stage of the first flow using the hardware decoder;

(b) first fetching and second using a first flow microinstruction for controlling the microprogram controlled successive stages of the first flow and simultaneously, with said first fetching, fetching a decode control storage access stage microinstruction for the second flow; and (c) executing the access stage microinstruction of the second flow using the microprogram controlled control storage access stage and simultaneously, with the executing, fetching a second flow microinstruction for controlling the microprogram controlled successive stages of the second flow and then executing the fetched second flow microinstruction for controlling the successive stages of the second flow.

6. A pipeline processing unit control system having a decoding stage and successive stages, said system comprising:

an instruction register for storing a multi-flow machine instruction having first and second flows where execution of each flow is controlled by a different microinstruction and each microinstruction having plural parts each part controlling one of the stages;

a hardware decoder, connected to said instruction register, for decoding the multi-flow machine instruction for the first flow in the decoding stage;

a first microprogram memory, connected to said instruction register, for storing microinstructions for the successive stages of the first and second flows;

a second microprogram memory, connected to said instruction register, for storing microinstructions for a control storage access stage of the second flow; and microprogram decoder means, connected to said first and second microprogram memories, for decoding the microinstructions in the access stage of the second flow and in successive stages in the second flow.

7. A system as recited in claim 6, further comprising:

a latch, connected between said instruction register and said first microprogram memory, for storing an address of the microinstructions in the successive stages of the first and second flows; and an address generating circuit, connected to said decoder means and said latch, for generating an address for the microinstructions of the second flow.

8. A pipeline processing unit control system having a decoding stage and successive stages, said system comprising:

an instruction register for storing a multi-flow instruction having first and second flows where execution of each flow is controlled by a different microinstruction, each microinstruction having plural parts each part controlling one of the stages;

a hardware decoder, connected to said instruction lregister, for decoding the multi-flow machine instruction for the first flow in the decoding stage;

a first microprogram memory, connected to said instruction register, for storing microinstructions for the successive stages of the first flow;

a second microprogram memory, connected to said instruction register, for storing microinstructions for a control store access stage of the second flow;

a third microprogram memory, connected to said instruction register, for storing microinstructions for the successive stages of the second flow; and microprogram decoder means, connected to said first through third microprogram memories, for decoding the microinstructions.

9. A system as recited in claim 8, further comprising:
a selector connected to said instruction register and said second microprogram memory;
a latch, connected between said selector and said third microprogram memory, for storing an address of the microinstructions in the successive stages of the first and second flows; and
an address generating circuit, connected to said decoder means and said selector, for generating an address for the microinstructions of the second flow.

10. A method according to claim 1, wherein said pipeline includes microinstruction stage registers corresponding to the pipeline stages and said method includes shifting the microinstructions through the stage registers and controlling the corresponding pipeline stage using outputs of the corresponding stage register.

11. A method according to claim 5, wherein said pipeline includes microinstruction stage registers corresponding to pipeline stages and said method includes shifting the microinstructions through the stage registers and controlling the corresponding pipeline stage using outputs of the corresponding stage register.

12. A control system according to claim 6, the pipeline having pipeline execution stages and said control system further comprising series connected microinstruction stage registers corresponding to the pipeline execution stages and connected to said first program memory, each register corresponding to a stage, the microinstructions being shifted successively through said stage registers during the first and second flows.

13. A control system according to claim 8, the pipeline having pipeline execution stages and said control system further comprising series connected microinstruction stage registers corresponding to the pipeline execution stages, and connected to said first program memory, each register corresponding to a stage, the microinstructions being shifted successively through said stage registers during the first and second flows.

* * * * *

UNITED STATES PATENT AND TRADEMARK OFFICE
CERTIFICATE OF CORRECTION

PATENT NO. : 4,812,970

DATED : March 14, 1989

INVENTOR(S) : Toshiaki Kitamura et al.

It is certified that error appears in the above-identified patent and that said Letters Patent is hereby corrected as shown below:

FRONT PAGE [30] Foreign Application Priority Data, line 1, "Nov. 10, 1983 [JP] Japan .... 58-211239" should be --Nov. 10, 1983 [JP] Japan ... 58-211230--.

FRONT PAGE [57] ABSTRACT, line 4, "control, is a method" should be --control, a method is--;

line 6, "of pipeline" should be --of the pipeline--;

line 14, delete "can";

line 15, delete "be formed"; and line 15, "instructs" should be --instruction,--;

line 20, "state" should be --stage--;

line 21, "flow" should be --flows--.

Col. 1, line 61, delete "of".

Col. 2, line 43, "abovementioned" should be --above-mentioned--;

UNITED STATES PATENT AND TRADEMARK OFFICE
CERTIFICATE OF CORRECTION

PATENT NO. :   4,812,970

DATED      :   March 14, 1989

INVENTOR(S) :  Toshiaki Kitamura et al.

It is certified that error appears in the above-identified patent and that said Letters Patent is hereby corrected as shown below:

Col. 2,   line 45, "of pipe-" should be --of the pipe- --.

Col. 3,   line 46, "controlled the" should be --controlled by the--;

Col. 4,   line 52, "above described" should be --above-described--;

line 57, "or lines" should be --(or lines)--.

Col. 5,   line 3, "Numerals," should be --numerals,--.

Col. 6,   line 58, "1register," should be --register,--.

Signed and Sealed this

Twenty-fifth Day of July, 1989

Attest:

DONALD J. QUIGG

Attesting Officer             Commissioner of Patents and Trademarks